United States Patent Office 3,019,227
Patented Jan. 30, 1962

3,019,227
ALKYL ACRIDINES
William E. Erner, Wilmington, Del., assignor to Houdry Process Corporation, Wilmington, Del., a corporation of Delaware
No Drawing. Filed Jan. 7, 1960, Ser. No. 958
4 Claims. (Cl. 260—279)

The present invention relates to the production of substituted and homologous acridine compounds, and is particularly concerned with synthesis of such acridine compounds containing an alkyl group attached to the carbon para (meso) to the hetero nitrogen, which carbon is herein designated 9 in accordance with commonly accepted ring numbering systems:

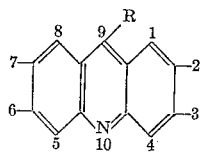

Acridine is a known intermediate for production of various dyes and pharmaceuticals. It occurs in the crude anthracene fraction from coal tar from which fraction it has been recovered by extraction and fractionation procedures. In view of the large demand for acridine dyes, various ways have been suggested or used for the synthesis of acridine and substituted acridines; for example:

(a) Dehydration of diphenylamine formate with zinc chloride effects ring closure to acridine. This method, while used in practice to some extent, has certain undesirable drawbacks. Synthesis of acridine from a zinc chloride melt (or other strong condensing agent) is prone to form polymeric nitrogen compounds of a tarry nature, presenting considerable difficulty in the recovery of the acridine in the desired purity for the manufacture of acridine dyes.

(b) By ring closure dehydration of N-phenyl anthranilic acid, acridone is obtained, which is converted to acridine by strong reducing agents followed by selective oxidation. This method, despite its complexity, is favored for commercial synthesis of acridine but is not adapted for the production of 9-alkyl (meso) substituted derivatives largely because of the non-availability and high cost of the required N-alkyl carboxy anilines.

(c) Acridine can also be produced by passing N-phenyl-o-toluidine or N-benzyl aniline (in presence of platinum) through a red hot tube. This method is not adapted for large scale manufacture nor to the production of alkyl or other derivatives of acridine containing the substituents at the meso carbon of acridine.

According to the present invention, acridine compounds substituted at the meso (9) carbon, are obtained by reacting diphenylamine in solution in an aliphatic carboxylic acid (or the acid addition salt thereby formed), in the presence of a solid acidic siliceous catalyst at a temperature in the range of 700–800° F. Thus, a solution of diphenylamine in acetic acid (diphenylamine acetate) passed over silica-alumina cracking-type catalyst results in the direct formation of 9-methyl-acridine in good yield and high concentration.

In similar manner, specific higher alkyl acridines are obtainable by starting with ring substituted diphenylamines and higher alkyl carboxylic acids containing up to 6 carbon atoms. With increasing length of the aliphatic carbon chain of the acid more opportunity for the accompanying formation of contaminating by-products occurs.

The starting diphenylamine compound may contain alkyl or other nuclear substituents, to form the correspondingly substituted acridines, provided that at least one of the positions ortho to the N on each benzene ring is unsubstituted, so as to permit condensation coupling through the carbon bridge.

The catalysts that may be employed in the aforesaid process include the typical hydrosilicates of alumina, of natural or synthetic origin, which have at least moderate activity in cracking of hydrocarbons. Typical catalysts of this kind include: acid-activated bentonite and kaolin clays, coprecipitated gels of silica and alumina containing 5 to 40% by weight $Al_2O_3$ and 95 to 60% $SiO_2$, and those of like silica-alumina range obtained by impregnation of silica gel with an aluminum salt and converting such salt to alumina. These synthetic siliceous catalysts may contain, in addition to or in substitution for all or part of the alumina, the usual refractory metal oxides of hydrocarbon cracking catalysts such as oxides of zirconium and manganesium.

EXAMPLE (a) 171 parts by weight of diphenylamine were dissolved in 240 parts acetic acid (about 1:4 molal ratio). The solution was vaporized and passed over synthetic silica-alumina catalyst in the form of 4 mm. cylindrical pellets (about 87.5% $SiO_2$, 12.5% $Al_2O_3$), at 730° F. and at a space rate of 0.85 volume of charge (determined as liquid) per hour per volume of catalyst. The vapor effluent reaction product was condensed and collected.

(b) The condensate contains in addition to 9-methyl acridine, unreacted diphenylamine and acetic acid. The acetic acid and other soluble materials are readily removed by washing with water or weakly alkaline solutions (bicarbonate). The unreacted diphenylamine is then separated by fractionation, such as by vacuum distillation with or without steam.

(c) Instead of washing and fractionating the condensate from (a) above, the 9-methyl acridine therein may be converted directly to an insoluble pigment which is easily separated from the remaining components. The condensate was dissolved in dimethyl formamide and the obtained solution reacted with cuprous pyridinium chloride (in the manner described in copending application Serial No. 1176, filed January 8, 1960). A bright orange insoluble pigment of cuprous 9-methyl acridinium chloride was obtained in essentially quantitative yield. These and related cuprous halide complexes are further described and claimed in said copending application. The cuprous pyridinium halide is obtained by reacting pyridine with cuprous chloride in a common solvent such as dimethyl formamide. The obtained solution can be used directly as reactant to form insoluble pigments of certain heterocyclic N bases.

(d) If desired to recover the metal-free 9-methyl acridine from the pigment, the obtained precipitate from (c) above is washed free of soluble salts and then dissociated by boiling with caustic. The free 9-methyl acridine base is then recovered by distillation from the remaining copper hydroxide.

(e) The obtained 9-methyl acridine crystallizes from ligroin solution as colorless plates, having a melting point of 117–118° C. The compound is sparingly volatile with steam; readily oxidizable to quinoline carboxylic acids. Methyl chloride adds readily to form the quaternary methochloride, crystallizing as needles having a melting point of 200° C. The corresponding methiodide addition compound forms red needle crystals of 235–245° C. melting point. These quaternary methyl halide addition compounds are soluble in water, sparingly in ethanol and insoluble in ether. Tartaric acid adds to 9-methyl acridine with the formation of the corresponding tartarate, crystallizing from aqueous solution in needles melting at 153–154° C. The corresponding picrates crystallize from ethanol solution as needles of 213–214° C. melting point.

In similar manner, there may be formed the corresponding 9-alkyl acridines using propionic, butyric, valeric, etc. acid instead of acetic.

When starting with substituted diphenylamines containing one or more alkyl or other substitutents in meta or para position, the corresponding substituted acridine compounds are obtained having these starting substituents in addition to the aliphatic hydrocarbons substituent in the meso position of the formed acridine compound.

Obviously many modifications and variations of the invention as hereinbefore set forth may be made without departing from the spirit and scope thereof, and therefore only such limitations should be imposed as are indicated in the appended claims.

What is claimed is:

1. The method of producing acridine compounds containing an alkyl hydrocarbon substituent in the 9-position, which comprises passing a diphenylamine, free from additional functional substituents, and an alkyl carboxylic acid of 2 to 6 carbon atoms over solid acidic siliceous cracking catalyst, at a temperature in the range of 700–800° F., and condensing the obtained vapor effluent.

2. The method according to claim 1 wherein said catalyst is hydrosilicate of alumina.

3. The method of claim 1 wherein said carboxylic acid is acetic acid.

4. The method of recovering the acridine compound from the condensate obtained in accordance with claim 1 which comprises converting the acridine compound in said condensate to an insoluble metal halide pigment by reaction with a soluble pyridinium metal halide and decomposing the obtained pigment with caustic to free the acridine base therefrom.

References Cited in the file of this patent

Albert: The Acridines (1951), pages 67–73.